(12) United States Patent
Pegg (10) Patent No.: US 8,457,696 B2
(45) Date of Patent: Jun. 4, 2013

(54) HANDHELD ELECTRONIC COMMUNICATION DEVICE

(75) Inventor: Albert Pegg, Cambridge (CA)

(73) Assignee: Research In Motion Limited, Waterloo (CA)

( * ) Notice: Subject to any disclaimer, the term of this patent is extended or adjusted under 35 U.S.C. 154(b) by 218 days.

(21) Appl. No.: 12/783,335

(22) Filed: May 19, 2010

(65) Prior Publication Data

US 2011/0275414 A1     Nov. 10, 2011

(30) Foreign Application Priority Data

May 10, 2010  (EP) ..................................... 10162467

(51) Int. Cl.
*H04M 1/00*       (2006.01)
(52) U.S. Cl.
USPC .................. 455/575.3; 455/575.1; 455/575.4; 455/90.3; 455/566; 379/433.13; 361/679.06
(58) Field of Classification Search
USPC ............. 455/566, 575.1–575.8, 550.1, 556.1, 455/556.2, 90.1–90.3; 379/433.12, 433.13; 361/679.04–679.07, 679
See application file for complete search history.

(56) References Cited

U.S. PATENT DOCUMENTS

| | | | |
|---|---|---|---|
| 6,700,773 B1 | 3/2004 | Adriaansen et al. | |
| 7,079,872 B2 * | 7/2006 | Khalid et al. | 455/566 |
| 7,158,634 B2 * | 1/2007 | Eromaki | 379/433.13 |
| 7,299,526 B2 | 11/2007 | Kim | |
| 7,433,722 B2 | 10/2008 | Sakamoto et al. | |
| 7,440,783 B2 | 10/2008 | Hyun | |
| 7,546,150 B2 | 6/2009 | Makino | |
| 7,634,300 B2 | 12/2009 | Bliss | |
| 8,032,192 B2 * | 10/2011 | Park | 455/575.4 |
| 8,086,290 B2 * | 12/2011 | Yoon et al. | 455/575.4 |
| 8,108,016 B2 * | 1/2012 | Gaddy | 455/575.4 |
| 8,219,159 B2 * | 7/2012 | Lai et al. | 455/575.1 |
| 8,229,522 B2 * | 7/2012 | Kim et al. | 455/575.3 |
| 8,326,381 B2 * | 12/2012 | Holman et al. | 455/575.4 |
| 2002/0090980 A1 * | 7/2002 | Wilcox et al. | 455/566 |

(Continued)

FOREIGN PATENT DOCUMENTS

| | | |
|---|---|---|
| DE | 102005049815 B3 | 1/2007 |
| WO | 2004104678 A1 | 12/2004 |
| WO | 2008071217 A1 | 6/2008 |

OTHER PUBLICATIONS

Chan, "Acer DX650—Overview" (CNET Asia), Apr. 17, 2009, 6 pages, online: http://asia.cnet.com/reviews/mobilephones/0,39051199,44685893p,00.html.

(Continued)

*Primary Examiner* — Sharad Rampuria
(74) *Attorney, Agent, or Firm* — Geoffrey deKleine; Borden Ladner Gervais LLP (57) ABSTRACT

A handheld electronic communication device including a body including an input device facing a first direction, and a display device coupled to the body. The display device has a first display screen and a second display screen. The second display screen faces an opposite direction as the first display screen. The display device is rotatable between a first position in which the first display screen faces the first direction, and a second position in which the second display screen faces the first direction, and releasably lockable in a third position, intermediate the first position and the second position.

10 Claims, 6 Drawing Sheets

U.S. PATENT DOCUMENTS

| | | | |
|---|---|---|---|
| 2004/0246665 A1* | 12/2004 | Cheng et al. | 361/683 |
| 2006/0082518 A1 | 4/2006 | Ram | |
| 2006/0146488 A1* | 7/2006 | Kimmel | 361/681 |
| 2006/0172761 A1 | 8/2006 | Im et al. | |
| 2006/0264243 A1* | 11/2006 | Aarras | 455/566 |
| 2009/0005131 A1 | 1/2009 | Gitzinger et al. | |
| 2009/0061956 A1 | 3/2009 | Matsuoka | |
| 2009/0170571 A1* | 7/2009 | Alameh et al. | 455/575.3 |
| 2010/0016038 A1 | 1/2010 | Demuynck et al. | |
| 2010/0159997 A1* | 6/2010 | Wang | 455/566 |
| 2010/0173676 A1* | 7/2010 | Zhou | 455/566 |
| 2012/0224301 A1* | 9/2012 | Pegg | 361/679.01 |
| 2012/0224302 A1* | 9/2012 | Pegg | 361/679.01 |

OTHER PUBLICATIONS

"LG Voyager—VX10000 (Verizon Wireless)" (CNET), Nov. 2007, 19 pages, online: http://reviews.cnet.com/cell-phones/lg-voyager-vx10000-verizon/4505-6454_7-32640927.html.

European Patent Application No. 10162467.4, European Search Report dated Oct. 5, 2010.

European Patent Application No. 10163307.1, Search Report dated Oct. 29, 2010.

* cited by examiner

HANDHELD ELECTRONIC COMMUNICATION DEVICE

FIELD OF TECHNOLOGY

The present disclosure relates to handheld electronic communication devices including, but not limited to, handheld electronic communication devices having touch-sensitive displays.

BACKGROUND

Handheld electronic communication devices have gained widespread use and may provide a variety of functions including, for example, telephonic, electronic text messaging and other personal information manager (PIM) application functions. handheld electronic communication devices can include several types of devices including mobile stations such as simple cellular phones, smart phones, and Personal Digital Assistants (PDAs).

Devices such as PDAs or smart phones are generally intended for handheld use and ease of portability. Smaller devices are generally desirable for portability. Touch-sensitive devices constructed of a display, such as a liquid crystal display (LCD), with a touch-sensitive overlay are useful on such handheld devices as such handheld devices are small and are therefore limited in space available for user input and output devices. Further, the screen content on the touch-sensitive devices can be modified depending on the functions and operations being performed.

BRIEF DESCRIPTION OF THE DRAWINGS

Embodiments of the present disclosure will now be described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

Figure 1:
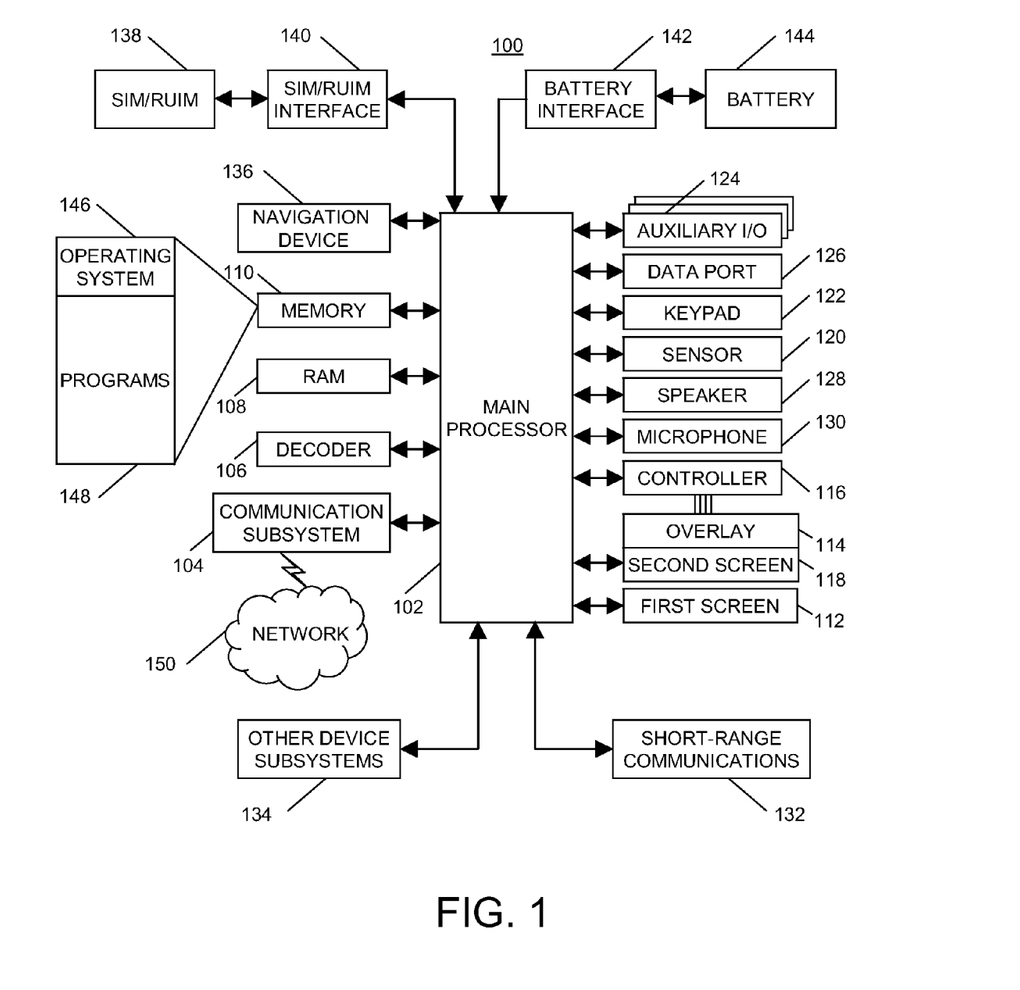
FIG. 1 is a simplified block diagram of components including internal components of a handheld electronic communication device according to an example embodiment.

Referring first to FIG. 1, a block diagram of components of the handheld electronic communication device 100 is shown. The handheld electronic communication device 100 includes multiple components such as a processor 102 that controls the operations of the handheld electronic communication device 100. Communication functions, including data and voice communications, are performed through a communication subsystem 104. Data received by the handheld electronic communication device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The handheld electronic communication device 100 is a battery-powered device and includes a battery interface 142 for receiving one or more rechargeable batteries 144.

The processor 102 also interacts with additional subsystems such as a Random Access Memory (RAM) 108, a flash memory 110, a first display screen 112, a second display screen 118 with a touch-sensitive overlay 114 connected to an electronic controller 116 that together comprise a touch-sensitive display, a position sensor 120, a keypad 122, an auxiliary input/output (I/O) subsystem 124, a data port 126, a speaker 128, a microphone 130, a navigation device 136, short-range communications 132 and other device subsystems 134. User-interaction with the graphical user interface may be performed utilizing the navigation device 136, the keypad 122, and the touch-sensitive overlay 114. The processor 102 interacts with the touch-sensitive overlay 114 via the electronic controller 116. Information, such as text, characters, symbols, images, icons, and other features that may be displayed or rendered on a handheld electronic communication device, are displayed on the display device, on at least one of the first display screen 112 and the second display screen 118, via the processor 102.

To identify a subscriber for network access according to the present embodiment, the handheld electronic communication device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The handheld electronic communication device 100 also includes an operating system 146 and software components 148 that are executed by the processor 102 and are typically stored in a persistent store such as flash memory 110. Additional applications may be loaded onto the handheld electronic communication device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the handheld electronic communication device 100 is similar. The speaker 128 outputs audible information converted from electrical signals, and the microphone 130 converts audible information into electrical signals for processing.

Figures 2A, 2B:
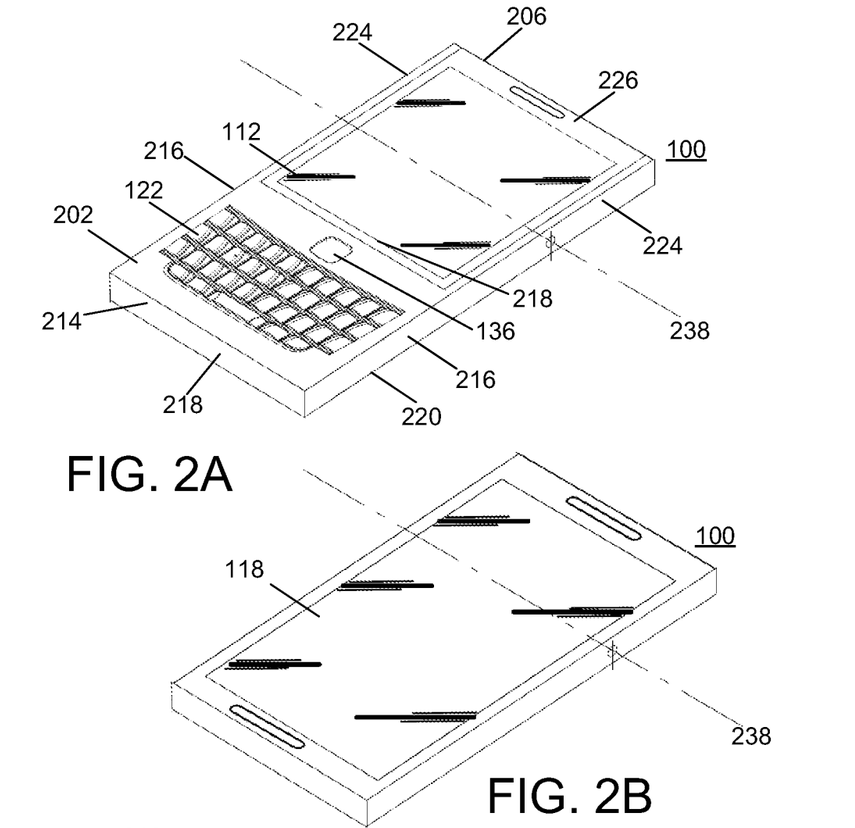
FIG. 2A, FIG. 2B and FIG. 2C are views of an example of a handheld electronic communication device including a display device in a first position.
Figure 2C:
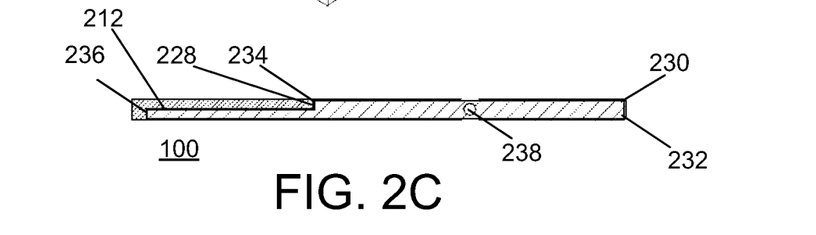
Figure 3A:
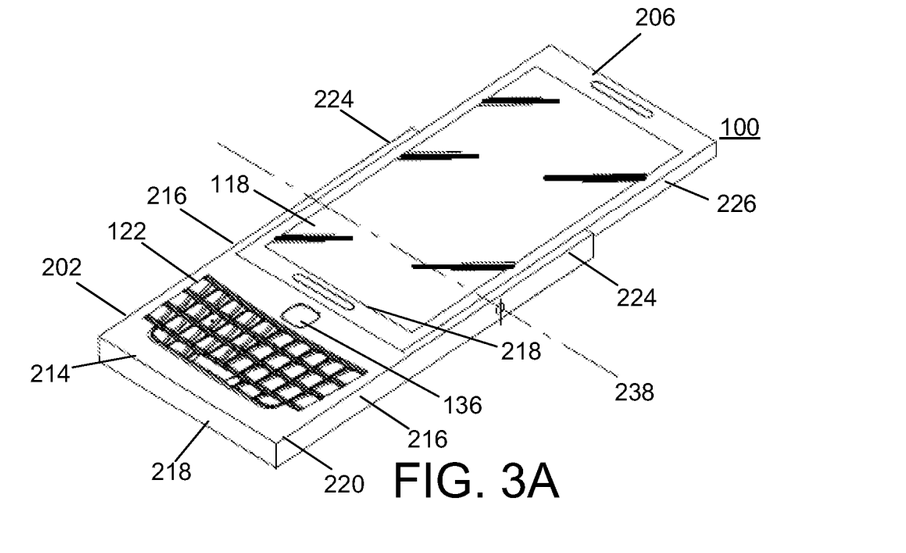
FIG. 3A and FIG. 3B are views of the example handheld electronic communication device of FIG. 2A, with the display device in a second position.
Figure 3B:
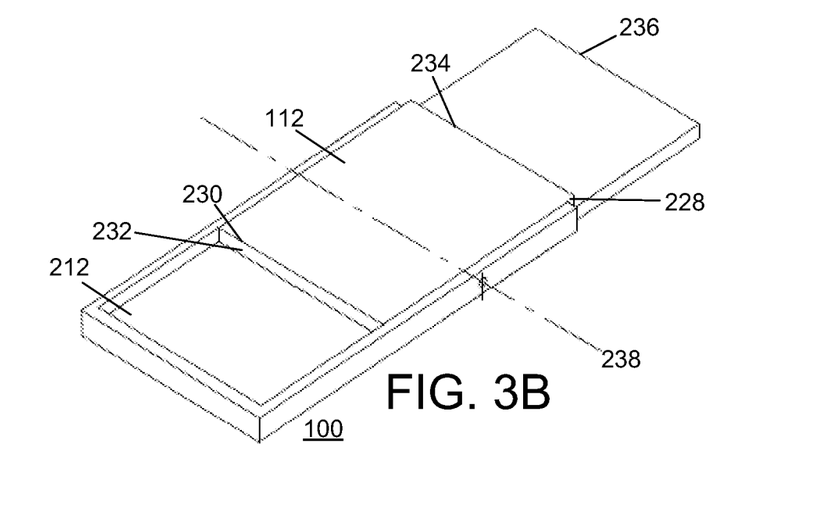
Figure 4A:
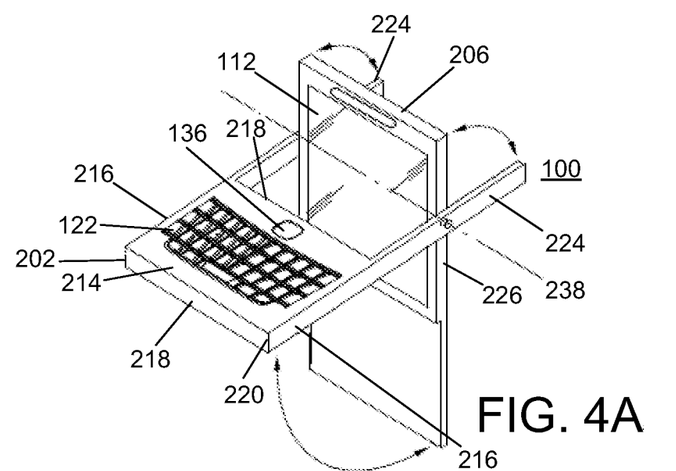
FIGS. 4A and 4B are views the example handheld electronic communication device of FIG. 2A, with the display device, intermediate the first position and the second position.
Figure 4B:
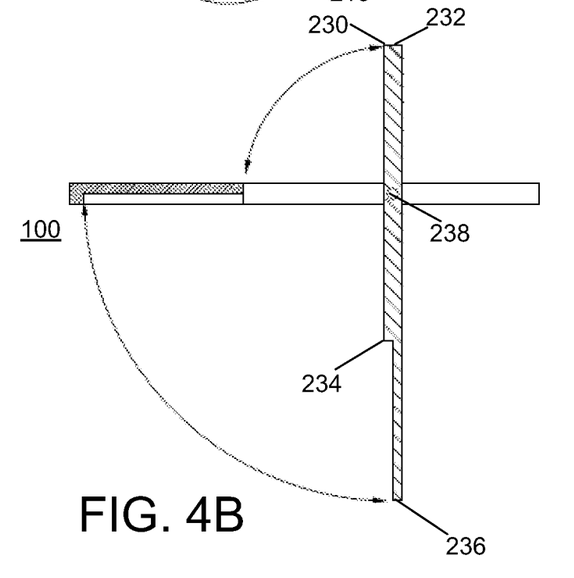

Referring to FIGS. 2A, 2B and 2C, a front perspective, back perspective and sectional side view of the handheld electronic communication device 100 with the display device 206 in a first position, are shown. In FIGS. 3A and 3B, a front perspective and back perspective view of the handheld electronic communication device 100 with the display device 206 in a second position, are shown. FIGS. 4A and 4B show a front perspective view and a sectional side view of the handheld electronic communication device 100 with the display device 206 intermediate the first position and the second position. The handheld electronic communication device 100 generally includes a body 202 including an input device, which in the example illustrated is a keypad 122 facing a first direction. The handheld electronic communication device 100 also includes a display device 206 coupled to the body 202. The display device 206 has a first display screen 112 and a second display screen 118. The second display screen 118 faces an opposite direction as the first display screen 112. The display device 206 is rotatable between a first position (shown in FIG. 2A through FIG. 2C) in which the first display screen 112 faces the first direction, and a second position (shown in FIG. 3A and FIG. 3B) in which the second display screen 118 faces the first direction.

The body 202 includes a back 212 and a front 214 spaced from the back 212, sidewalls 216, and end walls 218 that extend between and connect the back 212 and the front 214. In the present example, front 214, the back 212, the sidewalls 216, and the end walls 218 form a housing 220 for housing at least some of the internal components of the handheld electronic communication device 100. The front 214, back 212, sidewalls 216, and end walls 218 may be molded to form the housing 218. The back 212 may include a plate that is attachable and removable to facilitate insertion and removal of the battery 144 (shown in FIG. 1) and SIM/RUIM card 138 (shown in FIG. 1) in the housing 220. Alternatively, the battery and SIM/RUIM card may be housed in the display device.

The front 214 of the body 202 includes the keypad 122, which is a physical keypad 122 in the present example. The front 214 also includes a navigation device 136, which in the present example, may be an optical trackpad, joystick, a trackball, a touchpad or any other suitable input navigation device. Other buttons, keys or input devices may also be included.

The sidewalls 216 extend to provide arms 224 that extend from the housing 220, past one of the end walls 218. The arms 224 may extend a length that is approximately the same or similar to the length of the housing 220. The two arms 224 are generally rectangular and extend generally parallel to each other. The body 202 thereby forms a cavity, between the arms 224 and the one of the end walls 218, in which a portion of the display device 206 is located.

The display device 206 includes the first display screen 112 and the second display screen 118, each framed by a display housing 226 that provides protection around the edges of each of the first display screen 112 and the second display screen 118. The first display screen 118 and the second display screen 118 are disposed back to back in the housing such that the first display screen 112 and the second display screen 118 face opposing directions. The first display screen 112 may be a liquid crystal display (LCD), an organic light emitting diode (OLED) display, or any other suitable display. Similarly, the second display screen 118 may be an LCD, an OLED display, or any other suitable display. The second display screen 118 is approximately equal in width to that of the first display screen 118 but is longer so that the second display screen 118 is at least 25% larger than the first display screen 112. The second display screen 118 in the present example is about double the length of the first display screen 112. Thus, the displayable area, or area available for displaying information, of the second display screen 118 is twice that of the first display screen 112. A first edge 230 of the first display screen 112 is generally aligned with a first edge 232 of the second display screen 118 and a step 228 is located in the display housing 226, near a second edge 234 of the first display screen 112, as the first display screen 112 ends and the second display screen 118 extends further such that the second edge 236 of the second display screen 118 is spaced from the second edge 234 of the first display screen 112.

One or both of the first display screen 112 and the second display screen 118 may be part of a touch-sensitive display. The touch-sensitive display may be any suitable touch-sensitive display such as a capacitive touch-sensitive display, resistive touch-sensitive display, or any other suitable touch-sensitive display for detecting touches. For the purpose of the present example, the second display screen 118 is part of a capacitive touch-sensitive display that includes the touch-sensitive overlay 114 connected to the controller 116 to detect touches on the touch-sensitive overlay 114.

The display housing 226 cooperates with the arms 224 such that the display device 206 is rotatable approximately 180 degrees relative to the body 202 between the first position and the second position. The display housing 226 rotates relative to the arms 224, about a rotation axis 238 that is offset from a center of the display housing 226. The display housing 226 may be connected with the arms 224, to facilitate rotation, in any suitable manner. For example, the display housing 226 may include a projection on each side, that cooperates with openings or cavities in the arms 224 about which the display housing 226 rotates. The arms 224 may include electrical circuitry connecting components of the display device 206 to the processor 102 housed in the housing 220 of the body 202. Any other suitable hinge mechanism may be utilized to facilitate rotation.

In the first position, the first display screen 112 is disposed above the keypad 122, in the orientation in which the keypad is upright, and faces the same direction as the keypad 122. In the first position, the second display screen 118 faces the opposite direction as the keypad 122. The step 228 in the display housing 226, at the first edge 230 of the first display screen 112, is located adjacent the one of the end walls 218 past which the arms 224 extend. The first display screen 112 is therefore located in the cavity between the arms 224 and the one of the end walls 218. The second display screen 118 extends to cover the back 212.

In the second position, the second display screen 118 is disposed above the keypad 122, in the orientation in which the keypad is upright, and faces the same direction as the keypad 122. In the second position, the first display screen 112 faces the opposite direction as the keypad 122. The display housing 226, at the second edge 236 of the second display screen 118, is located adjacent the one of the end walls 218 past which the arms 224 extend. A portion of the second display screen 118 is located in the cavity between the arms 224. The second display screen 118, however, is longer than the arms 224 and therefore a remainder of the second display screen 118 extends past the arms 224.

A sensor 120, also referred to herein as a position sensor 120, such as a Hall effect sensor, is disposed in the handheld electronic communication device 100 to detect a position of the display device 206. The sensor 120 may detect when the display device 206 is in the first position. Alternatively, or additionally, a sensor may detect when the display device 206 is in the second position. A Hall effect sensor is one suitable sensor. Other suitable sensors, including, for example, a mechanical switch, may be utilized to determine an orientation of the display device 206. Utilizing a signal from the sensor 120, the first display screen 112 may be utilized and the second display screen 118 turned off when the display device 206 is in the first position. Utilizing a signal from the sensor 120, the second display screen 118 may be utilized and the first display screen 112 turned off when the display device 206 is in the second position. Further, the touch-sensitive overlay 116 on the second display screen 118 may be activated to detect a touch when the display device 206 is in the second position.

To move from the display device 206 from the first position to the second position, a force may be applied directly to the display device 206 to cause rotation in one direction. Similarly, a force may be applied directly to the display device 206 to rotate the display device 206 in the opposite direction, from the second position to the first position. The display device 206 may also be biased into one or both of the positions or may be biased out of the position by, for example, a spring force on the display device 206. The display device 206 and the body 202 may have cooperating release features to release the display device 206 from one or both of the positions.

Figure 5:
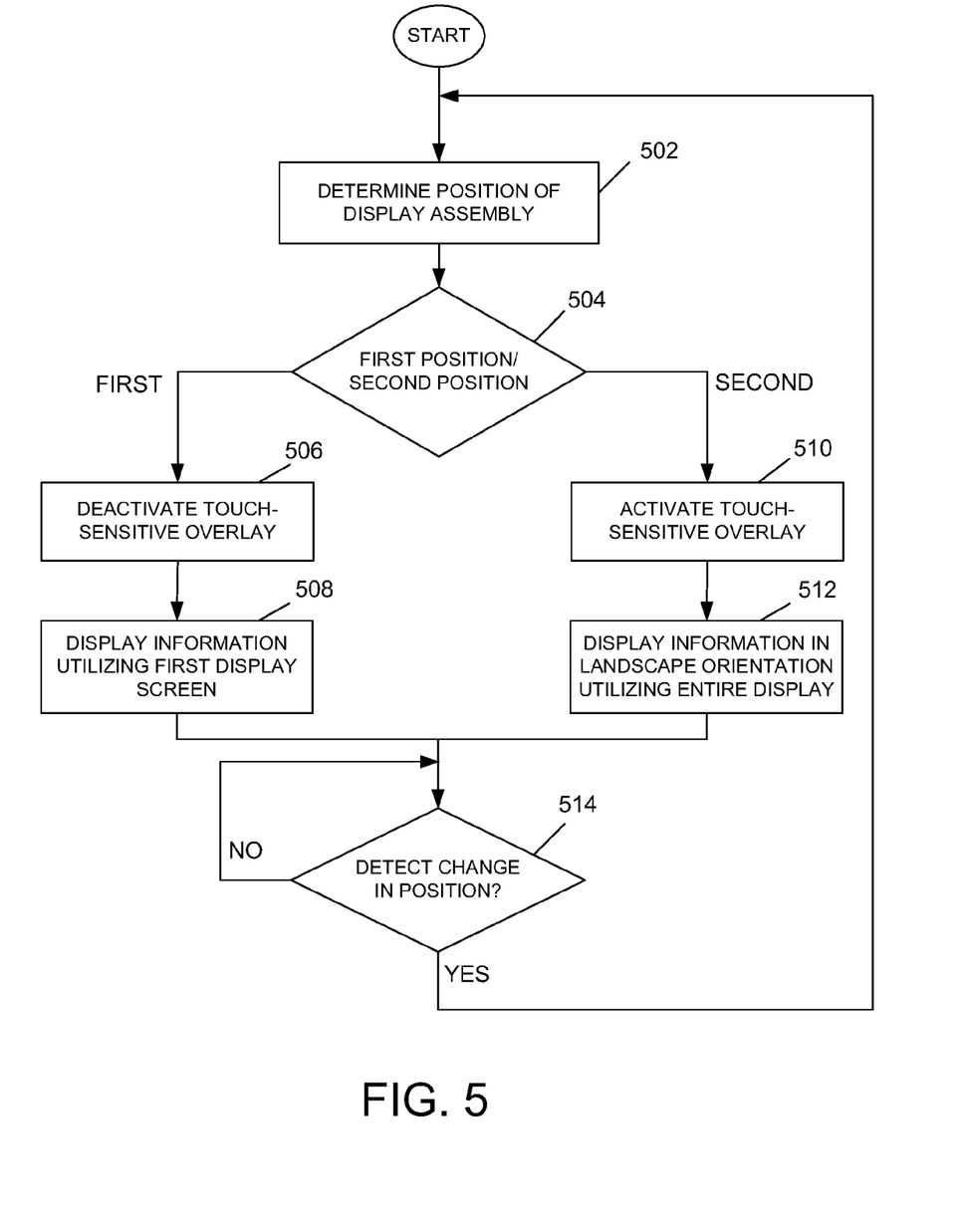
FIG. 5 is a flowchart illustrating a method of controlling a handheld electronic communication device.

Referring to FIG. 5, a flow chart illustrating a method of controlling the handheld electronic communication device 100 is shown. The method may be carried out by software executed, for example, by the processor 102. Coding of software for carrying out such a method is within the scope of a person of ordinary skill in the art given the present description. The method may contain additional or fewer processes than shown and/or described, and may be performed in a different order.

The method starts when the handheld electronic communication device 100 is turned on or in the awake state, the position of the display device 206 is determined at 502, utilizing the signal from the sensor 120. When the display device 206 is in the first position at 504, the touch-sensitive overlay 114 is deactivated at 506 such that touches are not detected. Information that is displayed on the portable handheld communication device 100 is displayed at 508 utilizing the first display screen 112. When the display device 206 is in the second position at 504, the touch-sensitive overlay 116 is activated at 510 such that touches are detected. Information that is displayed on the portable handheld communication device 100 is displayed at 512 utilizing the second display screen 118. When a change in the position of the display device 206 is detected at 514, the process continues at 502.

Figure 6A:
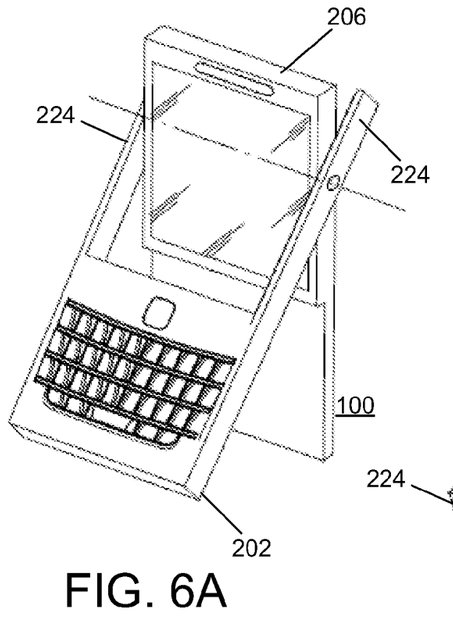
FIGS. 6A and 6B are views of the example handheld electronic communication device including the display device in a third position.
Figure 6B:
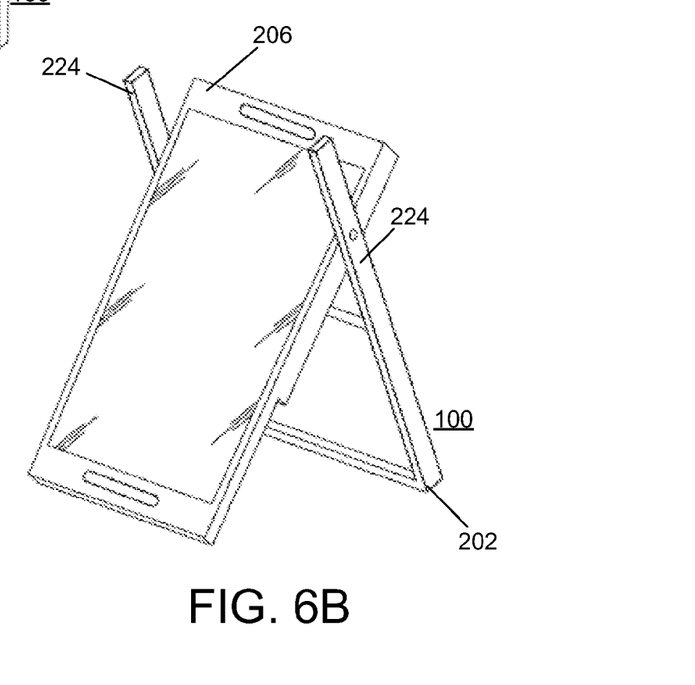

The display device 206 is movable relative to the body 202 to a third position, intermediate the first position and the second position, as shown in FIG. 6A and FIG. 6B. The display device 206 may be retained in the third position through the use of, for example, detents and complementary, cooperating notches in the arms 224 and the sides of the display device 206. The third position may be utilized to releasably lock the body 202 and the display device 206 at an angle with respect to each other and thereby facilitate standing the handheld electronic communication device 100 on edges of the body 202 and the display device 206, as illustrated. The display device 206 may be released from the intermediate position by application of sufficient force to cause the detents to move out of the notches, thereby overcoming the locking force. Other mechanisms for releasably locking the display device 206 relative to the body 202 may be utilized. Alternatively, the display device 206 may be releasably locked relative to the body 202 by frictional engagement. A sensor may be utilized to detect when the display device 206 is in the third position and a feature may be rendered on the display device 206 in response to detecting that the display device 206 is in the third position. The third position facilitates use of the device for display of a feature, for example, a clock or a digital photo album.

According to another example embodiment, the first display screen 112 and second display screen 118 may be turned on or off or a user may switch from one of the first display screen 112 and the second display screen 118 to the other utilizing a mechanical or virtual button, or a selectable feature such as a menu item, a touch sensor, or any other suitable sensor or device to facilitate switching from one screen to the other without moving the display device 206, relative to the body 202, from the first position to the second position.

The handheld electronic communication device 100 described herein includes different positions of the display device relative to the body. Thus, the display device is moveable relative to the body to provide different device forms, commonly referred to as form factors. The positions provide a display with a keyboard and an extended portrait orientation display with the keyboard. The handheld electronic communication device may be stored or utilized in a compact position. The display device 206 may also be moved to the second position in which a larger screen is utilized, for example, for viewing more information while still providing a keypad, keyboard, or other input device.

According to one aspect, a handheld electronic communication device is provided. The handheld electronic communication device includes a body including an input device facing a first direction, and a display device coupled to the body. The display device has a first display screen and a second display screen. The second display screen faces an opposite direction as the first display screen. The display device is rotatable between a first position in which the first display screen faces the first direction, and a second position in which the second display screen faces the first direction, and releasably lockable in a third position, intermediate the first position and the second position.

While the embodiments described herein are directed to particular implementations of the actuating assembly and the handheld electronic communication device and the, it will be understood that modifications and variations may occur to those skilled in the art. All such modifications and variations are believed to be within the sphere and scope of the present disclosure.

What is claimed is:

1. A handheld electronic communication device comprising:
   a body including an input device facing a first direction;
   a display device coupled to the body and having a first display screen and a second display screen, the second display screen facing an opposite direction as the first display screen, the display device rotatable relative to the body between a first position in which the first display screen faces the first direction, and a second position in which the second display screen faces the first direction, and releasably lockable in a third position, intermediate the first position and the second position;
   wherein, when the display device is in the third position, the body and the display device are at an angle with respect to each other to facilitate standing of the handheld electronic communication device.

2. The handheld electronic communication device according to claim 1, wherein the second display screen comprises a touch screen.

3. The handheld electronic communication device according to claim 1, comprising a sensor cooperating with the display device to detect when the display device is in the third position.

4. The handheld electronic communication device according to claim 3, comprising a processor connected to the sensor and to the display device to render a feature on the second display screen in response to detecting that the display device is in the third position.

5. The handheld electronic communication device according to claim 4, wherein the feature comprises a clock.

6. The handheld electronic communication device according to claim 4, wherein the feature comprises a digital photo album.

7. The handheld electronic communication device according to claim 1, wherein the display device is releasably lockable in the third position utilizing detents and complementary notches in the display device and the body.

8. The handheld electronic communication device according to claim 1, wherein the display device is releasably lockable in the third position by frictional engagement of the display device with the body.

9. The handheld electronic communication device according to claim 1, wherein the input device is exposed and accessible for input when the display device is in the first position.

10. The handheld electronic communication device according to claim 9, wherein the input device is exposed and accessible for input when the display device is in the second position.

* * * * *